(No Model.)

N. BASSET.
VOLTAIC BATTERY.

No. 304,897. Patented Sept. 9, 1884.

Witnesses:
John C. Tunbridge.
John M. Speer.

Inventor:
N. Basset
by his attorneys
Briesen & Steele

UNITED STATES PATENT OFFICE.

NICOLAS BASSET, OF PARIS, FRANCE.

VOLTAIC BATTERY.

SPECIFICATION forming part of Letters Patent No. 304,897, dated September 9, 1884.

Application filed January 5, 1884. (No model.) Patented in France September 29, 1883, No. 157,791; in Belgium October 2, 1883, and in England October 4, 1883, No. 4,728.

*To all whom it may concern:*

Be it known that I, NICOLAS BASSET, a citizen of France, residing at Paris, in the French Republic, have invented a new and useful Improvement in the Method of Forming Voltaic Batteries, (for which I have obtained a patent in Great Britain for fourteen years, No. 4,728, bearing date October 4, 1883, in France, for fifteen years, dated September 29, 1883, No. 157,791, and in Belgium for fifteen years, dated October 2, 1883, of which the following is a specification.

This invention has for its object the construction of a voltaic battery yielding a primary current which is constant and intense, and yielding, also, a secondary current for completing the work of the primary couple. The primary element consists of zinc and carbon couples set in separate liquids and separated by a porous cell of minimum resistance. The conducting-liquid on the zinc side is a solution of alkaline chloride more or less concentrated and alkalized, and of a density about equal to that of the exciting-fluid of the carbon side. This latter is a solution of double salts, whose formula is $MnClFe_2Cl_3$, which gives off an equivalent of chlorine taken up by the zinc. Dechloridizing may be carried to the extreme limit, but it is best in practice not to reduce the chloride $Fe^2,Cl^3$, beyond its transformation to protochloride. The electro-motive force of this element is, first, Daniell, twenty-five, and is constant if the strength of the element is maintained. The loss with an open circuit is reduced to a minimum. In maintaining this strength, a little of the liquid is withdrawn from time to time from the zinc side and replaced by the alkaline chloride solution. At the carbon side a little of the liquid is removed when it has become of an olive-green shade, and crystals are added of $MnClFe_2Cl_3$, which are prepared as hereinafter described. In certain cases of alkalization of the alkaline chloride, which is produced by adding to the solution of KCl, or NaCl, $\frac{1}{20}$ to $\frac{1}{10}$ of soda, this addition raises the electro-motive force to $\frac{24}{16}$ Daniell, and a forced alkalinity is maintained. The alkali passes to the state of chloride before the zinc is chloridized by the current, a certain proportion of zincate being produced. In all cases alkalization is optional and in accordance with the result desired.

Figure 1:
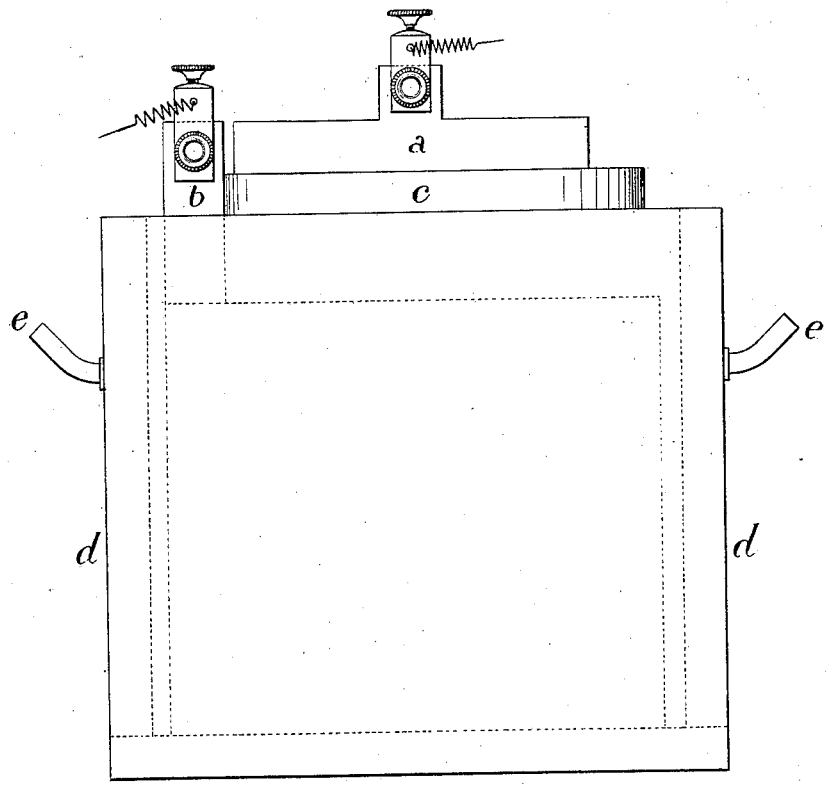
Figure 2:
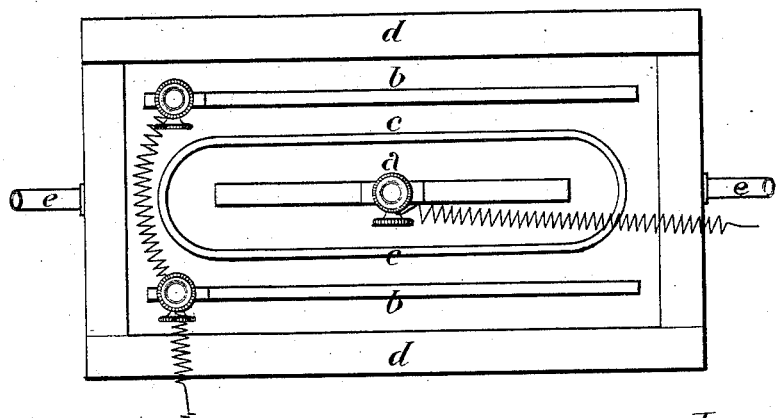

In the drawings, Figure 1 is a side view of a battery embodying my primary pile. Fig. 2 is a top view of the same.

*d* is a vessel, of wood or other substance, holding in its middle an electrode, *a*, of zinc or iron. Around this electrode is placed a porous vessel, *c*. *b b* are the carbons plunged into the exciting or depolarizing liquid already described. *e e* are the pipes for supplying the said liquid. The external vessel *d* may be of metal, provided it is lined on the inner side with a sufficient layer of wax and paraffined resin.

The preparation of the depolarizing-fluid $MnClFe_2Cl_3$ is as follows: The process of preparing $Fe_2Cl_3$ is well known, it sufficing, in the first instance, to dissolve together the equivalents of each of the two salts; but the preparation of the sesquichloride of iron by the action of nitric acid, or by that of chlorine or chloric acid, is disagreeable and inconvenient, and is less economical. Preference is therefore given to the following method: After having prepared the solution of protochloride of iron, FeCl, by the action of hydrochloric acid on old iron chips or scraps, the protochloride is heated with powdered peroxide of manganese, adding by degrees the hydrochloric acid till it reaches the formula $MnO_2 + 2(FeCl) + 2HCl = MnClFe_2Cl_3 + 2HO$. This process obviates the employment of nitric acid, the chlorine being absorbed as it is liberated by FeCl, and by the manganese, so that the preparation is easily effected.

As it is advantageous to feed the pile with crystals, or at least with crystalline paste, I add to the concentrated solution of $MnCl Fe_2Cl_3$ a sufficient quantity of alkaline chloride. Evaporation is effected with a bath of boiling water, care being taken to leave a slight excess of hydrochloric acid. The conducting-liquid is enriched with chloride of zinc, which does not sensibly impair reaction; but it is expedient to restore it to its primary condition. With this view it suffices to treat it when not in use in the battery with an alkali or an alkaline carbonate; but I first precipitate the iron and the manganese, if in ebullition they should accidentally come in contact with the carbonate of zinc.

The oxide or the carbonate of zinc can be sold or restored to metal either by drying or by the electrolytic process.

From what has been previously said the exciting-fluid $MnClFe_2Cl_3$ or $MnClFe_2Cl_3NaCl$, is re-established by boiling some minutes on $MnO_2$, with the gradual addition in useful proportion of hydrochloric acid. The residue, oxide of iron and manganese, is similarly treated when dechloridizing has been carried too far.

The porous cells or diaphragms $c$, of minimum resistance, are made in the following manner: A mixture is prepared of about thirty parts of plastic clay, twenty-five parts of broken crucibles or sand, thirty parts of hard coke or plumbago, and fifteen parts of sesquioxide of iron. These proportions should be considered as an example only. These matters are pulverized and passed through a fine sieve. They are then made with water into plastic paste, to which the desired form is given, and after drying in the shade these cells are then placed in an oven, and are surrounded and filled with dry sand, and are then baked to red heat. Two hours' baking suffices.

I may add that the diaphragm or the porous vase may be dispensed with in double-fluid batteries when the agent employed does not offer too much resistance, and that in this case it suffices to plunge the two electrodes into the liquid, taking care that they do not touch; and I frequently use external vases of metal, plastering them over on the inner side with a thick layer of wax and paraffined resin. I place my electrodes in a box or trough, which may be of wood coated or lined with wax or colcothar, or it may be of metal similarly lined, or of glass or stone.

By the aid of my method light may economically be produced by incandescence or by arc. Small motors and machinery used in small industries may be worked. It is useful for the economical and continuous ringing of alarms; in regulating the currents necessary in galvano-plastics or electro-metallurgy; in telegraphy, for the telephone or microphone, and for supplying power for locomotives or for industrial works.

I claim—

1. An electric battery consisting of the outer vessel, $d$, inner porous vessel, $c$, central zinc electrode, $a$, separate carbons $b\ b$, and of the depolarizing-liquid, $MnClFe_2Cl_3$, on the carbon side, and of an alkaline chloride solution on the zinc side, substantially as herein specified.

2. In an electric battery, the depolarizing-liquid $MnClFe_2Cl_3$, substantially as herein specified.

NICOLAS BASSET.

Witnesses:
A. BLÉTRY,
ROBT. M. HOOPER.